US008795497B2

(12) United States Patent
Sato et al.

(10) Patent No.: US 8,795,497 B2
(45) Date of Patent: Aug. 5, 2014

(54) CELL SORTER AND CELL SORTING METHOD

(75) Inventors: Kazumasa Sato, Tokyo (JP); Yoichi Katsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/272,906

(22) Filed: Oct. 13, 2011

(65) Prior Publication Data

US 2012/0103813 A1 May 3, 2012

(30) Foreign Application Priority Data

Oct. 29, 2010 (JP) ................................ 2010-243650

(51) Int. Cl.
*B01D 57/02* (2006.01)
*G01N 27/447* (2006.01)
*G01N 27/453* (2006.01)

(52) U.S. Cl.
USPC ......................... 204/547; 204/643; 435/173.9

(58) Field of Classification Search
USPC ........ 204/450, 547, 600, 630, 643; 435/173.9
See application file for complete search history.

(56) References Cited

U.S. PATENT DOCUMENTS

2002/0108859 A1* 8/2002 Wang et al. .................. 204/547
2002/0125138 A1* 9/2002 Medoro ........................ 204/547
2004/0067167 A1* 4/2004 Zhang et al. ............... 422/82.05
2006/0243594 A1* 11/2006 Schnelle et al. .............. 204/547
2007/0125941 A1* 6/2007 Lee et al. ...................... 250/251
2009/0205963 A1* 8/2009 Medoro et al. ................ 204/547

FOREIGN PATENT DOCUMENTS

JP 2002-543972 12/2002
JP 2003-287519 10/2003
JP 2010-025911 2/2010
JP 2010-181399 8/2010

OTHER PUBLICATIONS

Japanese Office Action issued Mar. 11, 2014 in corresponding Japanese Patent Application No. 2010243650.

* cited by examiner

*Primary Examiner* — Susan D Leong
(74) *Attorney, Agent, or Firm* — K&L Gates LLP

(57) ABSTRACT

Disclosed herein is a cell sorter including a measuring electrode, working electrode, detection electrode, and output section. The measuring electrode forms a measuring electric field in a flow path to measure a complex dielectric constant of each cells flowing through the flow path. The working electrode forms, in the flow path, a working electric field to sort the cells by imparting a dielectrophoretic force to the cells and using the flow path. The detection electrode detects the presence of the cell in the fluid flowing through the flow path. The output section acquires a sorting signal based on information about the measured complex dielectric constant and a detection signal indicating the detection of the cell by the detection electrode. The output section outputs a working signal adapted to form the working electric field to the working electrode when the detection signal is acquired if the sorting signal is acquired.

4 Claims, 7 Drawing Sheets

CELL SORTER AND CELL SORTING METHOD

CROSS REFERENCES TO RELATED APPLICATIONS

The present application claims priority to Japanese Patent Application No. 2010-243650 filed on Oct. 29, 2010, the disclosure of which is incorporated herein by reference.

BACKGROUND

The present disclosure relates to a cell sorter and cell sorting method for sorting a cell.

In related art, a dielectric cytometry device has been proposed that is designed to measure the inherent complex dielectric constant of cells and sort cells using measurement result information (refer, for example, to FIGS. 3 and 5 in Japanese Patent Laid-Open No. 2010-181399, referred to as Patent Document 1 hereinafter).

Patent Document 1 discloses a flow path device adapted to allow for a fluid including cells to flow so as to, for example, analyze the cells and obtain the complex dielectric constant prior to cell sorting. A narrow portion is formed in part of the flow path formed in the flow path device. The narrow portion has a flow path sectional area that is small to such an extent that only a single cell can path therethrough. The complex dielectric constant distribution (dielectric spectrum) of each cell passing through this narrow portion is measured, thus allowing for the cells to be sorted by a sorter unit and a separation control section adapted to control the sorting unit downstream from the narrow portion.

SUMMARY

In the dielectric cytometry device described in Patent Document 1, however, no clarification is made as to specific configurations of the sorter unit, separation control section and other sections or a specific sorting method used by the device. At present, it is desired that the specific configurations thereof should be clarified so as to ensure cell sorting in a reliable manner.

For example, a possible method would be to maintain the fluid including cells flowing through the flow path of the flow path device constant, assume that the cells flow at the same speed as the fluid, and activate the sorter unit in a given period of time after the cells have passed through the complex dielectric constant measurement area. That is, a given delay time is set according to the flow path design.

In this case, however, it is necessary to set a delay time each time the flow path design changes. Further, it is actually likely that the cell flow speed is different depending on the cell structure, shape, size and other factors. Therefore, cells may not be sorted in a reliable manner if done so in a given delay time.

In light of the foregoing, it is desirable to provide a cell sorter and cell sorting method that can sort cells in a reliable manner without setting a delay time for each flow path design.

According to an embodiment of the present disclosure, there is provided a cell sorter that includes a measuring electrode, working electrode, detection electrode and output section.

The measuring electrode is provided, in a flow path having branch paths adapted to sort cells and through which a fluid including the cells flows, upstream from the branch paths. The measuring electrode forms a measuring electric field in the flow path to measure a complex dielectric constant of each of the cells flowing through the flow path.

The working electrode is provided downstream from the measuring electrode and upstream from the branch paths. The working electrode forms, in the flow path, a working electric field to sort the cells by imparting a dielectrophoretic force to the cells and using the flow path.

The detection electrode is provided downstream from the measuring electrode, upstream from the branch paths and in proximity to the working electrode to detect the presence of the cell in the fluid flowing through the flow path.

The output section acquires a sorting signal based on information about the measured complex dielectric constant and a detection signal indicating the detection of a cell by the detection electrode. If the sorting signal is acquired, the output section outputs a working signal adapted to form the working electric field to the working electrode when the detection signal is acquired.

In the embodiment of the present disclosure, the detection electrode adapted to detect the presence of a cell is provided separately from the measuring electrode and in proximity to the working electrode. A working signal is supplied to the working electrode when a detection signal is acquired from the detection electrodes. This eliminates the need to set a delay time for each flow path design. Further, this ensures more reliable sorting of a cell than if a cell is sorted in a given delay time after the cell has passed through the complex dielectric constant measurement area.

The working electrode may be arranged in a plurality of stages along the direction in which the fluid flows through the flow path. In this case, the output section outputs the working signal to each of the working electrodes. This makes it possible to control the movement of a cell in an elaborate manner in the direction of flow of a fluid, thus providing a reduced pitch between the cells included in the fluid (pitch in the direction of flow of the fluid) and contributing to enhanced throughput.

At least the two detection electrodes may be provided along the direction in which the fluid flows through the flow path in such a manner as to sandwich the working electrode. This allows for the detection electrode at the subsequent stage to detect the cell that has passed by the working electrode, thus making it possible to stop the formation of an electric field by the working electrode at a proper timing.

The detection and working electrodes may be combined into an integral electrode. Because the detection and working electrodes are not physically separate from each other, cells can be reliably sorted if the output section outputs a working signal adapted to form a working electric field when the detection signal is acquired.

A cell sorting method according to another embodiment of the present disclosure includes: forming, in a flow path having branch paths adapted to sort cells and through which a fluid including the cells flows, a measuring electric field upstream from the branch paths to measure a complex dielectric constant of each of cells flowing through the flow path; forming a working electric field in the flow path downstream from where the measuring electric field is formed and upstream from the branch paths to sort the cells by imparting a dielectrophoretic force to the cells and using the branch path; detecting the presence of the cell in the fluid flowing through the flow path upstream from the branch paths and in proximity to where the working electrode is formed; and generating, if a determination signal based on information about the measured complex dielectric constants is acquired, a working signal to form the working electric field when a detection signal indicating the detection of the presence of a cell is acquired.

In the embodiment of the present disclosure, the presence of a cell in the fluid flowing through the flow path is detected in proximity to where the working electric field is formed, and a sorting signal is generated when a detection signal, generated at the time of the detection, is acquired. This eliminates the need to set a delay time for each flow path design. Further, this ensures more reliable sorting of a cell than if a cell is sorted in a given delay time after the cell has passed through the complex dielectric constant measurement area (where the measuring electric field is formed).

Thus, the present disclosure eliminates the need to set a delay time for each flow path design and allows for reliable sorting of a cell.

Additional features and advantages are described herein, and will be apparent from the following Detailed Description and the figures.

DETAILED DESCRIPTION

Embodiments of the present application will be described below in detail with reference to the drawings.

[Configuration of the Cell Analysis and Sorting System]

Figure 1:
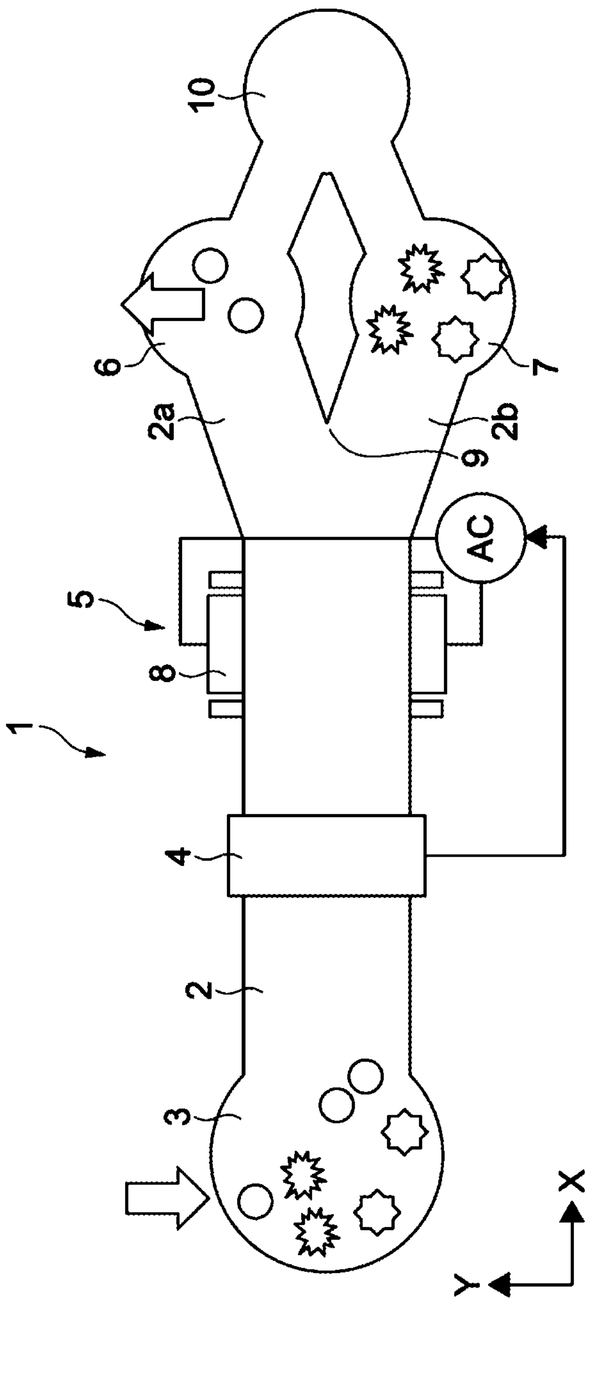
FIG. 1 is a conceptual diagram illustrating a cell analysis and sorting system according to an embodiment of the present disclosure.
Figure 2:
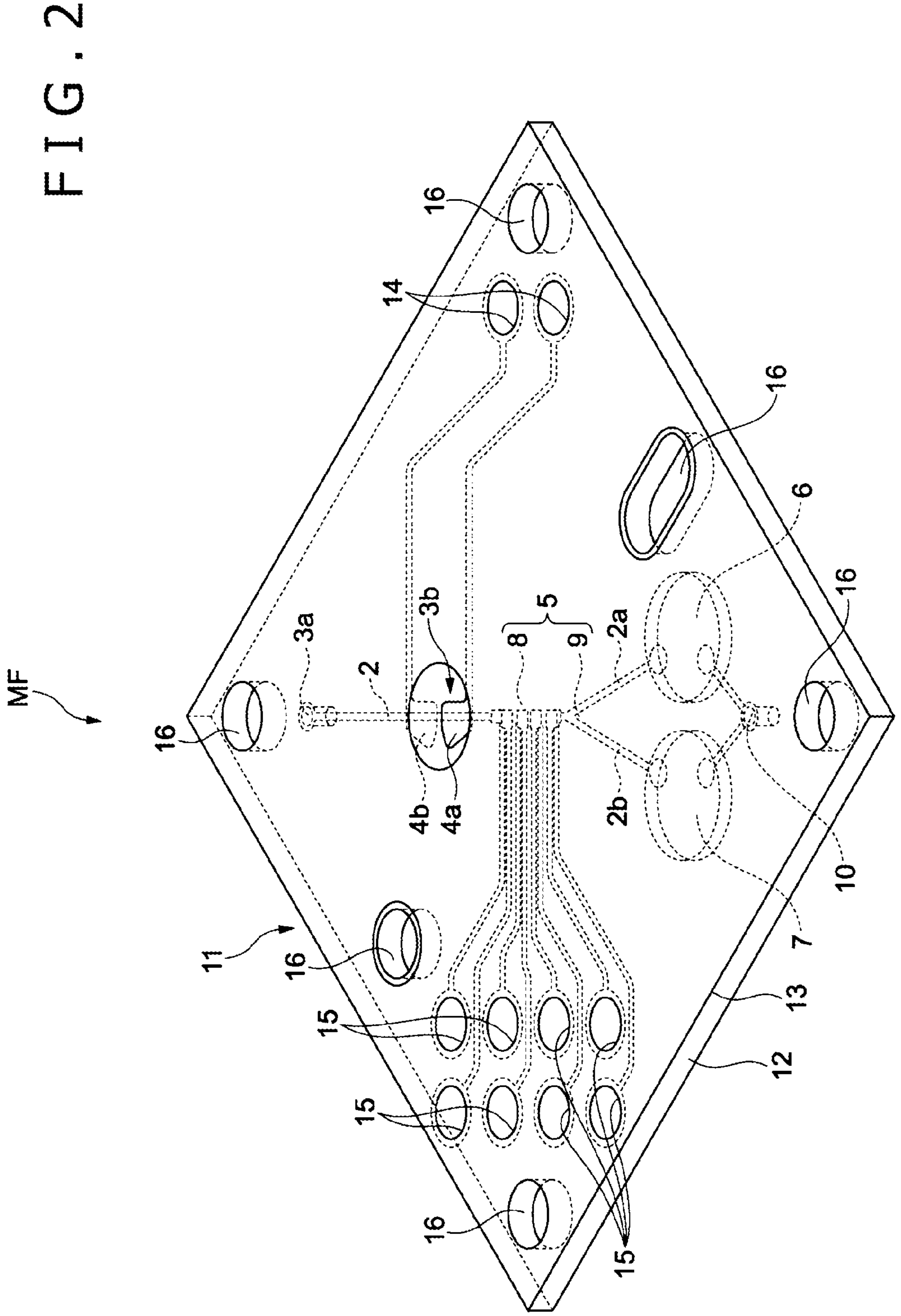
FIG. 2 is a perspective view illustrating a micro flow path device making up part of the cell analysis and sorting system illustrated in FIG. 1.

FIG. 1 is a conceptual diagram illustrating a cell analysis and sorting system according to an embodiment of the present disclosure. FIG. 2 is a perspective view illustrating a micro flow path device making up part of a cell analysis and sorting system 1 illustrated in FIG. 1.

As illustrated in FIG. 1, an injection section 3, measuring section 4, sorting section 5, cell extraction sections 6 and 7 and flowout section 10 are arranged in this order from upstream along a flow path 2 formed in a micro flow path device MF.

A sampled liquid (fluid) including cells is injected into the injection section 3 using, for example, an unshown pump.

The liquid injected from the injection section 3 flows through the flow path 2.

The measuring section 4 measures the complex dielectric constant of each of the cells flowing through the flow path 2 at multiple frequencies (three or more and typically about 10 to 20) in a frequency range (e.g., 1 MHz to 50 MHz) in which a dielectric relaxation phenomenon of the cells occurs. The unshown cell function analyzer electrically connected to the measuring section 4 determines, based on the measured complex dielectric constant of each cell, whether the cell should be extracted from the micro flow path device MF for use (e.g., inspection and reuse). When the measured cell should be extracted for use, the cell function analyzer outputs a sorting signal (determination signal). For example, the unshown cell function analyzer determines whether the measured complex resistance or complex dielectric constant of each cell falls within the range of the standard information measured in advance and stored in the memory. The cell function analyzer outputs a sorting signal when the complex resistance or complex dielectric constant falls within the range of the standard information.

The sorting section 5 sorts, of a plurality of types of cells injected from the injection section 3, desired cells into the cell extraction section 6 and others into the cell extraction section 7.

An electric field application section 8 provided in the sorting section 5 can apply an electric field having a gradient in a direction different from the X direction in which the fluid flows such as the Y direction orthogonal to the X direction. For example, the electric field application section 8 does not apply a working electric field when not supplied with a working signal (voltage signal) generated by using a sorting signal as a determination signal. However, when supplied with a working signal, the electric field application section 8 applies a working electric field and naturally, vice versa.

A branch section 9 branches off into branch paths 2*a* and 2*b* so that the cells to which no electric field has been applied by the electric field application section 8 flow through the branch path 2*b* to reach the cell extraction section 7 and so that the cells to which an electric field has been applied by the electric field application section 8 flow through the branch path 2*a* to reach the cell extraction section 6.

The cell extraction sections 6 and 7 communicate with the flowout section 10 via the flow path 2. The liquid passing through the cell extraction sections 6 and 7 is discharged externally from the flowout section 10 by using, for example, an unshown pump.

Here, if an electric field is applied to the cells existing in the liquid, an inductive dipole moment develops due to the difference in polarizability between the medium and cell. If the applied electric field is not uniform, the electric field intensity varies at different points around the cell, thus producing a dielectrophoretic force because of the inductive dipole.

[Micro Flow Path Device]

As illustrated in FIG. 2, the micro flow path device MF includes a substrate 12 and a member 13 in a sheet form made, for example, of a high molecular weight membrane. The substrate 12 has the flow path 2, branch paths 2*a* and 2*b* making up part of the flow path 2, a liquid injection section 3*a* serving as the injection section 3, the branch section 9 making up part of the flow path 2, cell extraction sections 6 and 7 and flowout section 10. These components are formed by forming, for example, grooves in the surface of the substrate 12 and covering the surfaces thereof with the member 13 in a sheet form, as a result of which the flow path 2 is formed.

A cell injection section 3*b* into which a liquid including cells is injected includes a narrow path, an extremely small hole in the member 13 in a sheet form. When dripped onto the cell injection section 3*b* with a pipette, a liquid including cells is drawn into the liquid flowing through the flow path 2 via the narrow path, causing the liquid including cells to flow downstream through the flow path 2. The narrow path 2 is an extremely small hole. Therefore, the cells flow, one by one, into the flow path 2 rather than two or more cells flowing thereinto at a time.

A pair of measuring electrodes 4*a* and 4*b* are provided in such a manner as to sandwich the narrow path. A given AC (alternating current) voltage is applied between the measuring electrodes 4*a* and 4*b* to form a measuring electric field in the narrow path. One of the measuring electrode 4*a* is provided on the front side of the membrane 13 in a sheet form. The other measuring electrode 4*b* is provided on the back side of the membrane 13 in a sheet form. A pair of electrodes (which will be described later) making up the electric field application section 8 are also provided on the back side of the membrane 13 in a sheet form.

The cell extraction sections 6 and 7 are covered on their top with the membrane 13 in a sheet form. Cells are extracted therefrom via a pipette which is stuck into the membrane 13 in a sheet form.

Electrode pads 14 externally extract a signal detected by the pair of measuring electrodes 4*a* and 4*b*. The extracted signal is transmitted, for example, to a cell function analyzer (not shown). Electrode pads 15 are supplied with a working signal generated by using a determination signal, output from the cell function analyzer, as a trigger. Further, a detection signal, supplied from the detection electrode which will be described later, is output via the electrode pads 15.

Through-holes 26 are provided for positioning when the micro flow path device MF is connected to the cell sorter having an analyzer and other devices.

[Sorting Section]

Figure 3:
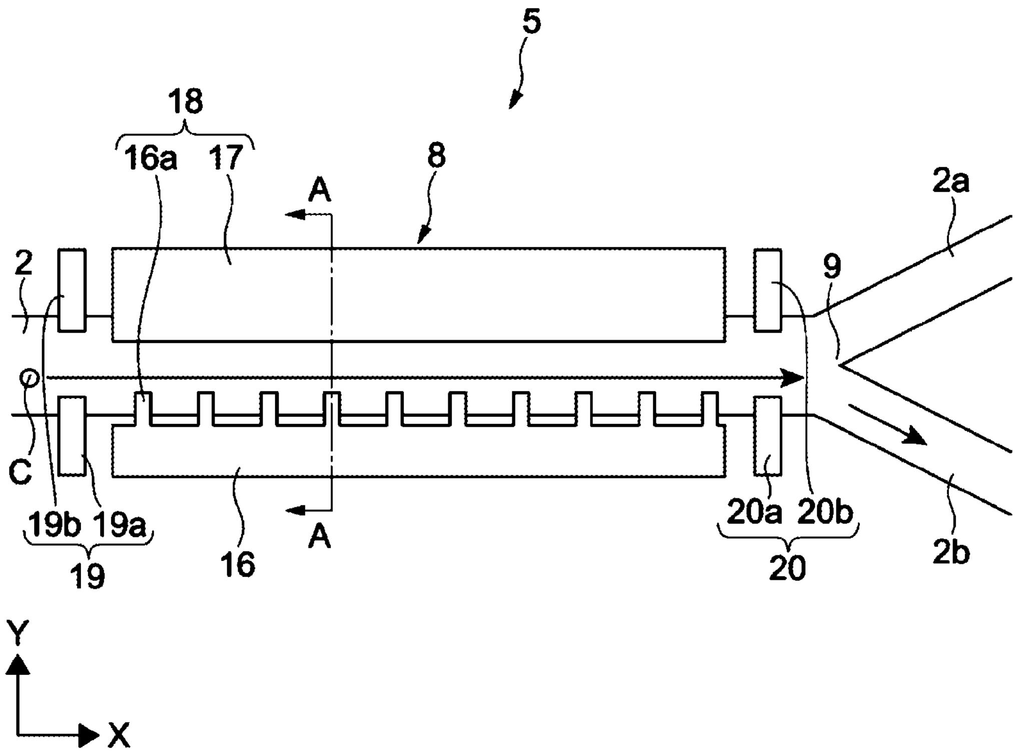
FIG. 3 is a plan view illustrating the configuration of a sorting section illustrated in FIG. 2.
Figure 4:
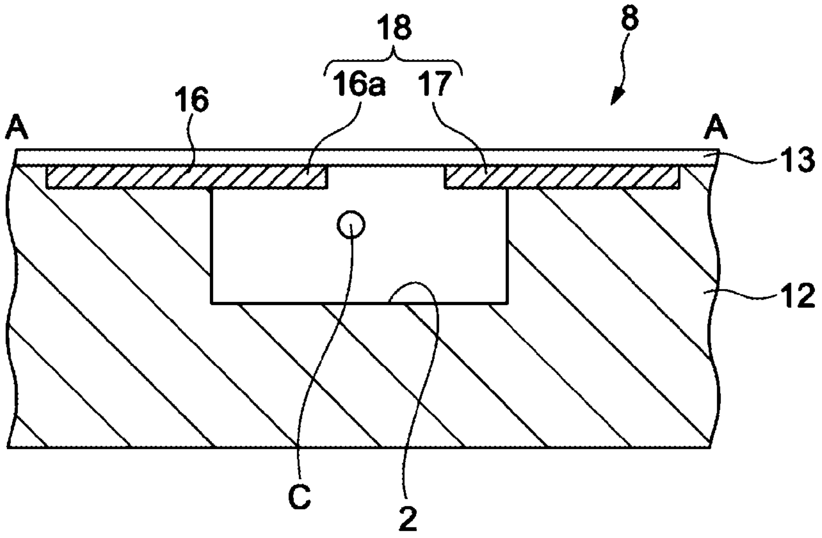
FIG. 4 is a cross-sectional view taken on line A-A illustrated in FIG. 3.

FIG. 3 is a plan view illustrating the configuration of the sorting section 5 illustrated in FIG. 2. FIG. 4 is a cross-sectional view taken on line A-A illustrated in FIG. 3.

As illustrated in FIGS. 3 and 4, the sorting section 5 includes two detection electrode pairs 19 (19*a* and 19*b*) and 20 (20*a* and 20*b*) adapted to detect the presence of a cell C in a fluid, electrodes 16 and 17 making up the electric field application section 8 and the branch section 9.

The electrodes 16 and 17 are arranged, for example, to be opposed to each other in such a manner as to sandwich the flow path 2 in a direction different from that (X direction) in which the fluid flows through the flow path 2 such as the Y direction.

The electrodes 16 and 17 are provided on the back side of the membrane 13 in a sheet form (top side of the flow path 2). The electrode 16 is an electrode to which a signal, for example, is applied and is formed so that a number of electrode fingers 16*a* project toward the electrode 17. The electrode 17 is, for example, a common electrode and has no projections and depressions unlike the electrode 16. A combination of the single electrode finger 16*a* and electrode 17 will be hereinafter referred to as a working electrode pair 18.

Each of the detection electrode pairs 19 and 20 is provided in proximity to the working electrode pairs 18. Further, the detection electrode pairs 19 and 20 are provided in such a manner as to sandwich the working electrode pairs 18. The term "the detection electrode pair 19 (or 20) is provided in proximity to the working electrode pairs 18" may mean that so long as electrical insulation can be maintained therebetween, these pairs may be brought close to each other to the extent possible.

On the other hand, the detection electrodes 19*a* and 19*b* are arranged to be opposed to each other in such a manner as to sandwich the flow path 2 in the Y direction as do the working electrode pairs 18. The same is true with the detection electrodes 20*a* and 20*b*.

The sorting section 5 configured as described above makes it possible to detect the presence of the cell C using the detection electrode pair 19 and apply electric fields each having a gradient in the Y direction using the working electrode pairs 18. A signal generated, for example, by superimposing a DC bias voltage on an AC voltage, is used as a working signal to form these electric fields.

The cell C whose direction of flow is changed at a given position downstream from the electric field application section 8 in the flow path 2 by a dielectrophoretic force as a result of application of electric fields by the electric field application section 8 is guided into the cell extraction section 6 using the branch path 2*a*.

Figure 5:
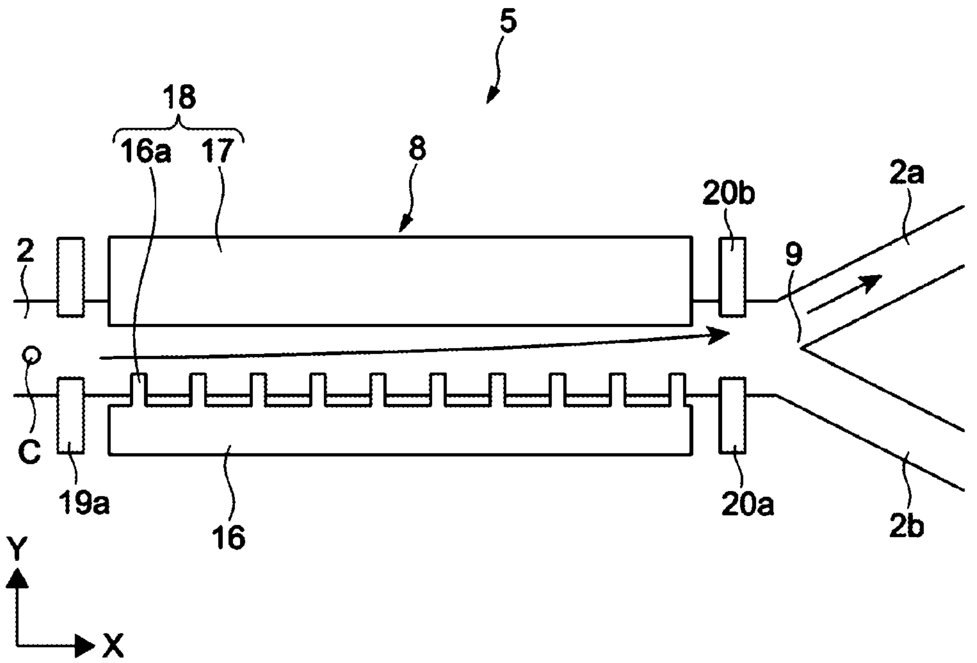
FIG. 5 is a diagram illustrating the manner in which the direction in which cells flow change as a result of an electric field being applied to an electric field application section.

For example, cells are injected into a position biased toward the side of the cell extraction section 7 in the injection section 3. When, of the cells injected into a position biased toward the side of the cell extraction section 7, a cell not to be sorted passes by the electric field application section 8, no electric fields are applied by the same section 8 (non-active). As a result, the cell flows on the biased side through the flow path 2, passing in an "as-is" manner through the branch path 2*b* and flowing into the cell extraction section 7 as illustrated in FIG. 3. However, when a cell to be sorted passes by the electric field application section 8, electric fields are applied by the same section 8 (active), imparting a dielectrophoretic force to the cell. This changes the direction of flow of the cell toward the cell extraction section 6 as illustrated in FIG. 5, causing the cell to be sorted to change its direction at the branch section 9, passing through the branch path 2*a* and flowing into the cell extraction section 6.

In the electric field application section 8 configured as described above, the working electrode pairs 18 apply electric fields, each having a gradient in the Y direction. As a result, the cells passing by the electric field application section 8 gradually change their course, allowing for the cells to pass through the branch path 2*a* and flowing into the cell extraction section 6.

[Circuit of the Sorting Section (Sorting Circuit)]

Figure 6:
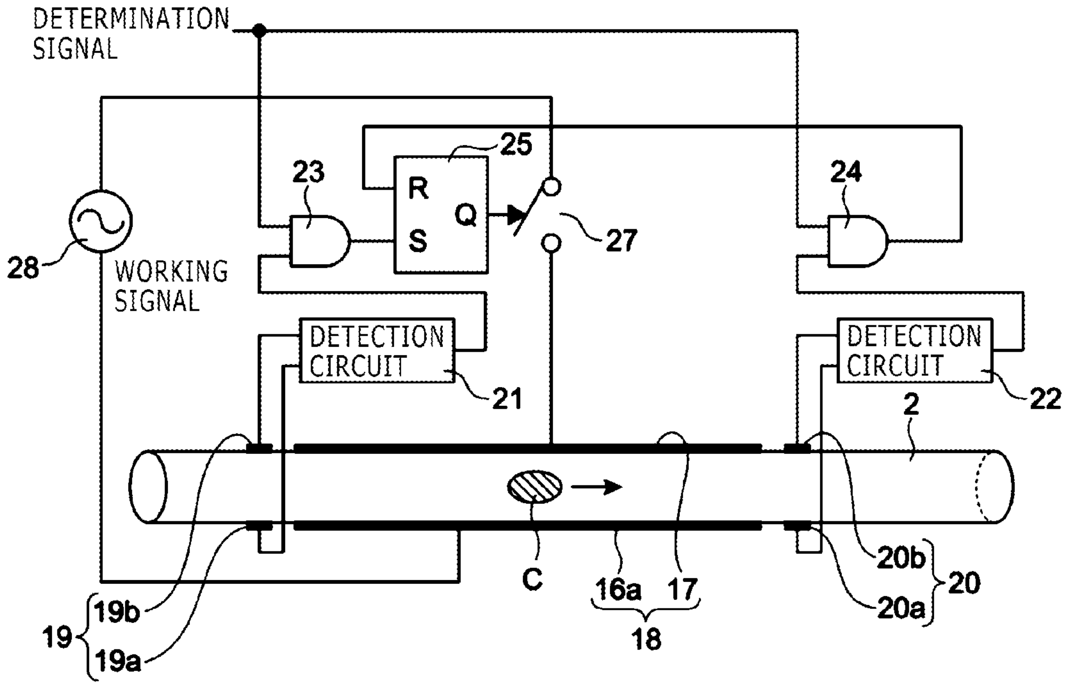
FIG. 6 is a diagram illustrating the electrical circuit configuration of the sorting section.

A description will be given next of the electrical circuit configuration of the sorting section. FIG. 6 mainly illustrates the circuit diagram of the sorting section.

FIG. 6 schematically shows the flow path 2, detection electrode pairs 19 and 20 and working electrode pairs 18. Detection circuits 21 and 22 are connected respectively to the detection electrode pairs 19 and 20. The detection circuit 21 forms an AC electric field for detection between the detection electrodes 19*a* and 19*b* in the Y direction in the flow path 2 by applying an AC voltage to the detection electrode pair 19. The detection circuit 21 monitors, for example, the complex resistance that changes (increases) as a result of flow of a cell between the detection electrodes 19*a* and 19*b*. If, for example, the complex resistance exceeds its threshold, the detection circuit 21 detects the presence of a cell there. The detection circuit 22 functions in the same manner as the detection circuit 21.

Gate circuits 23 and 24 are, for example, connected to the detection circuits 21 and 22, respectively. Detection signals are supplied from the detection circuits 21 and 22 respectively to the gate circuits 23 and 24. On the other hand, a determination signal (sorting signal) from the cell function analyzer is used as a gate signal supplied to the gate circuits 23 and 24 as described above.

An output signal from the gate circuit 23 is supplied to the set terminal (S) of a flip-flop 25. An output signal from the gate circuit 24 is supplied to the reset terminal (R) of the flip-flop 25. The flip-flop 25 switches ON a switch 27 when a signal is supplied to its set terminal and switches OFF the switch 27 when a signal is supplied to its reset terminal. A working signal generator 28 generates a working signal applied to the working electrode pair 18. The application of the working signal can be turned ON or OFF by the switch 27.

In the present embodiment, an "output section" can be implemented primarily by the detection circuit 21, working signal generator 28, gate circuit 23, flip-flop 25, switch 27 and other components.

A description will be given below of the operation of the sorting circuit configured as described above.

When the cell C passes between the detection electrodes 19*a* and 19*b* provided at the previous stage of this sorting circuit, the detection circuit 21 detects the presence of the cell C. If, at this time, a determination signal has been supplied to the gate circuits 23 and 24, the flip-flop 25 is set when the presence of the cell C is detected, thus switching ON the switch 27 and applying a voltage to the working electrodes. This changes the course of the cell C as illustrated in FIG. 3.

When the cell C passes between the detection electrodes 20*a* and 20*b* at the subsequent stage, the detection circuit 22 detects the passage of the cell. As a result, a detection signal is supplied to the gate circuit 24, resetting the flip-flop 25 and switching OFF the switch 27. This cancels the formation of working electric fields by the working electrode pairs 18.

These operations are performed for each of the cells C to be extracted from the cell extraction section 7. The cell C to be extracted from the cell extraction section 7 is guided into the branch path 2*a*.

As described above, in the present embodiment, the detection electrode pair 19 adapted to detect the presence of the cell C is provided separately from the pair of measuring electrodes 4*a* and 4*b* and in proximity to the working electrode pairs 18, allowing for a working signal to be supplied to the working electrode pairs 18 when a detection signal is acquired from the detection electrode pair 19. This eliminates the need to set a delay time for each flow path design. Further, the present embodiment ensures more reliable sorting of a cell than if a cell is sorted in a given delay time after the cell has passed through the complex dielectric constant measurement area.

[Other Embodiment of the Sorting Section]

The dielectrophoretic force exerted on a cell in an electric field where the cell is not fatally damaged is generally considerably smaller than the viscous resistance force to which a cell flowing through water at a speed of about mm/s is subjected. Therefore, it is necessary to have a number of non-uniform electric fields adapted to positively form a dielectrophoretic force in a direction orthogonal to the direction of flow or a number of columns of the working electrode pairs 18 (columns arranged in the X direction) adapted to form such non-uniform electric fields. As illustrated in FIGS. 3 and 5, if a voltage is applied to these many working electrode pairs 18 at the same time, it is necessary to use this electrode column sorting area in an exclusive manner, possibly resulting in low throughput.

Figure 7:
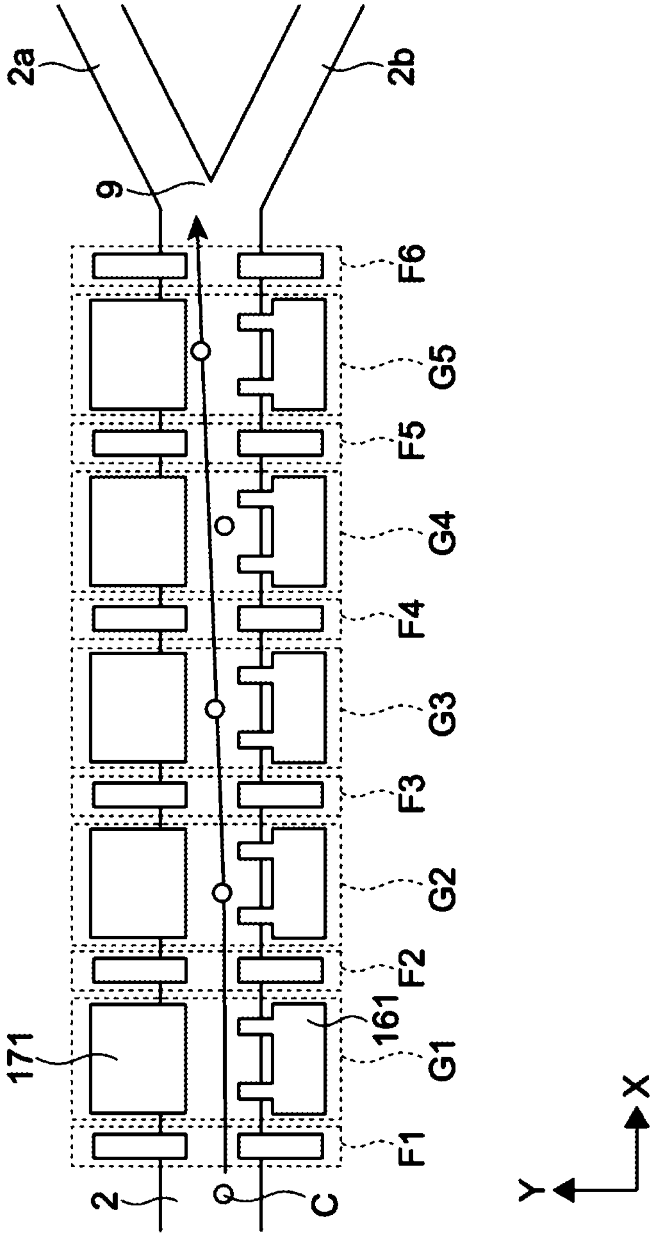
FIG. 7 is a plan view illustrating the configuration of the sorting section according to another embodiment.

As illustrated in FIG. 7, therefore, the working electrode pairs 18 shown in FIG. 3 are classified into groups G1 to G5 along the X direction. That is, an electrode 161 having two electrode fingers and an electrode 171 opposed thereto are used, for example, as a working electrode pair. The electric field application section is formed by providing the working electrodes in a plurality of stages along the direction of flow.

It is possible to permit the passage of multiple cells through the electric field application section 8 for improved throughput by individually controlling the voltages applied to the working electrode pairs G1 to G5. That is, in the electric field application section 8 shown in FIGS. 3 and 5, it is necessary to allow a cell into the flow path 2 at a proper timing so that this cell does not enter the electric field application section 8 before its previous cell finishes passing through the same section 8. In contrast, in the electric field application section 8 shown in FIG. 7, it is possible to apply an electric field to the cell passing by the working electrode pair G5 and not to apply any electric field to that passing by the working electrode pair G4. As a result, each of the working electrode pairs G1 to G5 can control the sorting of cells.

Detection electrode pairs F1 to F6 are arranged for these working electrode pairs G1 to G5 and in proximity thereto. Further, each of the detection electrode pairs F2 to F5 is arranged to be sandwiched between two of the working electrode pairs G1 to G5.

[Sorting Circuit According to Second Embodiment]

Figure 8:
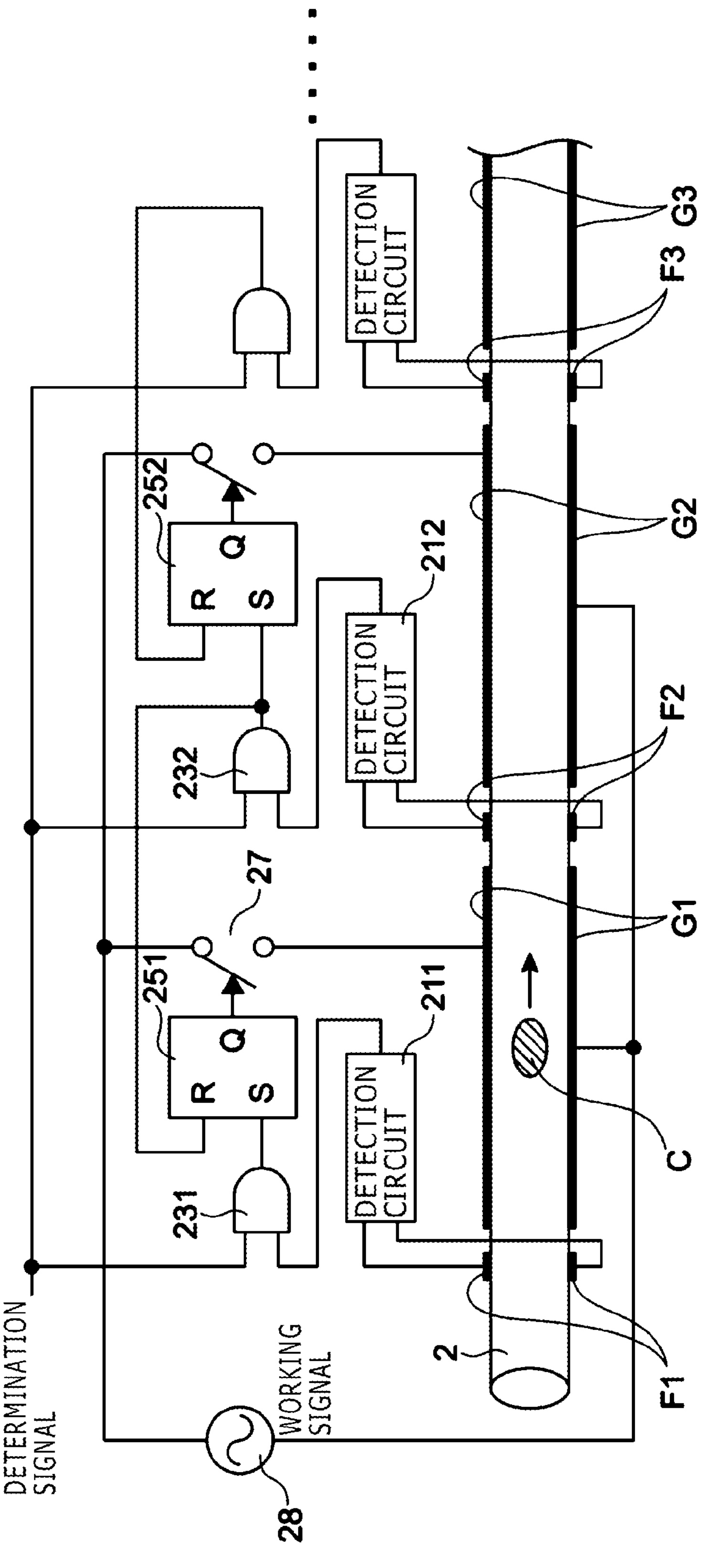
FIG. 8 is a diagram illustrating a sorting circuit (sorting circuit according to a second embodiment) that provides the operation of the sorting section configured as illustrated in FIG. 7.

FIG. 8 is a diagram illustrating a sorting circuit (sorting circuit according to a second embodiment) that provides the operation of the sorting section configured as illustrated in FIG. 7. This sorting circuit includes the sorting circuits shown in FIG. 6 connected in multiple stages and basically operates in the same manner as that shown in FIG. 6. We assume, for example, that the cell C of interest is currently a cell to be extracted from the cell extraction section 6 and that a determination signal is supplied to a gate circuit 232. When this cell C is detected by a detection circuit 212 connected to the detection electrode pair F2 after having passed by the working electrode pair G1, a flip-flop 251 is reset, thus canceling the working electric field applied by the working electrode pair G1 and setting a flip-flop 252. This causes a working electric field to be applied by the working electrode pair G2.

The present embodiment makes it possible to control the movement of a cell in the direction of flow of a fluid in an elaborate manner as described above, thus providing a reduced pitch between the cells included in the fluid (pitch in the direction of flow of the fluid) and contributing to enhanced throughput.

[Sorting Circuit According to Third Embodiment]

Figure 9:
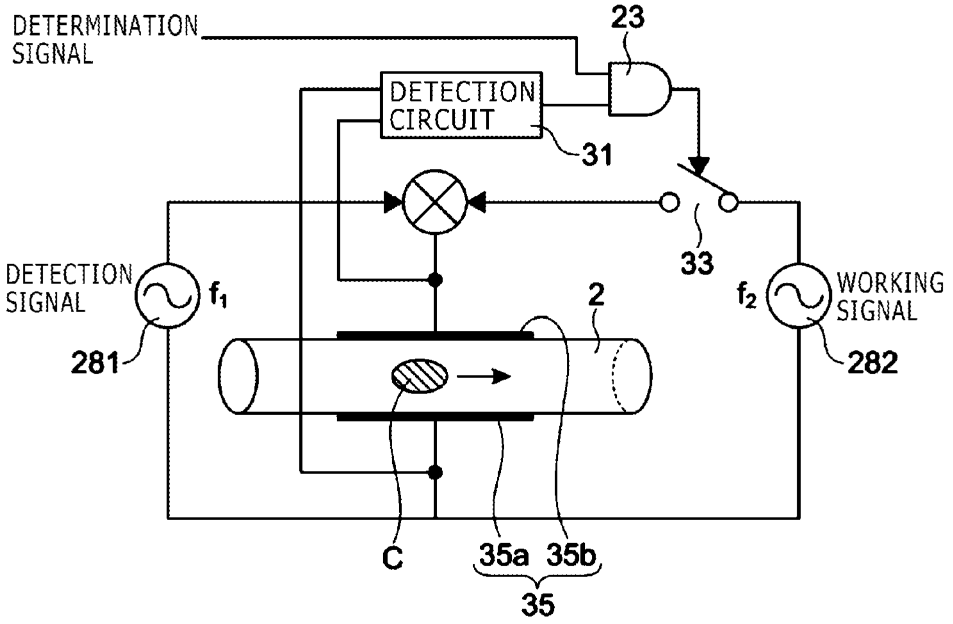
FIG. 9 is a diagram illustrating the sorting circuit according to still another embodiment (third embodiment).

FIG. 9 is a diagram illustrating the sorting circuit according to still another embodiment (third embodiment).

The sorting circuit according to the present embodiment includes an electrode pair 35 (35*a* and 35*b*) that is an integral electrode pair that combines the detection electrode pair with the working electrode pair described above. The electrode pair 35 may be typically shaped in the same form as the working electrode pair 18 shown in FIG. 3.

A detection signal generator 281 is connected to the electrode pair 35. Further, a working signal generator 282 is connected to the electrode pair 35 via a switch 33. The detection signal generator 281 generates a detection signal at a frequency f1, and the working signal generator 282 generates a working signal at a frequency f2. The signals generated by the detection signal generators 281 and 282 are superimposed and applied to the electrode pair 35.

The frequencies of the detection and working signals are set to be sufficiently far from each other to such an extent that no interference occurs. For example, if the detection signal frequency f1 is 100 kHz and its voltage level is 1 V, the working signal frequency f2 is 10 MHz and its voltage level is 20 V.

In the present embodiment, the "output section" is implemented primarily by a detection circuit 31, working signal generator 282, gate circuit 23, switch 33 and other components.

When the sorting circuit detects the presence of the cell C, the switch 33 is OFF and a detection electric field is formed between the electrodes 35*a* and 35*b* by a detection signal from the detection signal generator 281. If a determination signal is supplied to the gate circuit 23 in this detection condition, and if the cell C comes between the electrodes 35*a* and 35*b*, the detection circuit 31 detects the cell C based on the same principle as described above (change in complex resistance). This switches ON the switch 33, thus supplying a working signal from the working signal generator 282 to the electrode pair 35 and forming an electric field in which the detection and working electric fields are added together. As a result, the working electric field is applied to the cell C, thus changing the course of the cell C.

When the cell C flows past the point between the electrodes 35*a* and 35*b*, the detection circuit 31 detects the passage of the cell C, switching OFF the switch 33 through the gate circuit 23 and canceling the formation of a working electric field.

As described above, in the present embodiment, the detection electrode pair is integral with the working electrode pair. That is, the detection and working electrodes are not physically separate from each other. Therefore, a working signal adapted to form a working electric field is output when the detection circuit 31 detects the presence of the cell C, thus allowing for sorting of the cell in a reliable manner.

[Sorting Circuit According to Fourth Embodiment]

Figure 10:
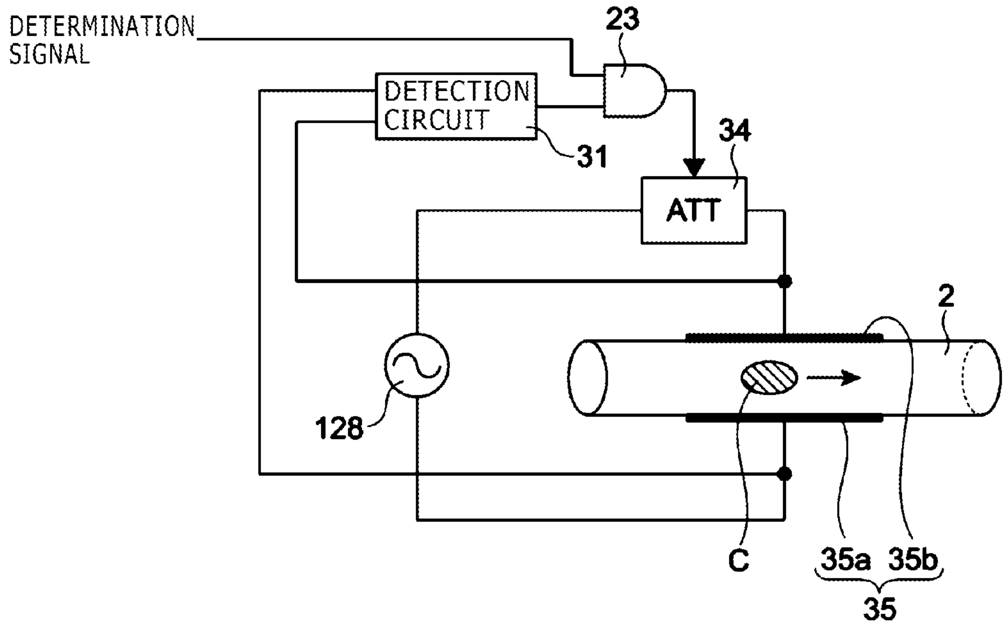
FIG. 10 is a diagram illustrating the sorting circuit according to still another embodiment (fourth embodiment).

FIG. 10 is a diagram illustrating the sorting circuit according to still another embodiment.

The sorting circuit according to the fourth embodiment differs from the sorting circuit shown in FIG. 9 primarily in that a signal generator 128 serves both as a detection signal generator and as a working signal generator and that a resistance attenuator 34 is provided in place of the switch 33.

When the sorting circuit detects the presence of the cell C, the output voltage of the AC voltage signal generated by the signal generator 128 is used, for example, as a first output voltage. In this case, therefore, an AC electric field appropriate to the first output voltage is formed between the electrodes 35*a* and 35*b*. If the detection circuit 31 detects the presence of the cell C while a determination signal is supplied to the gate circuit 23, the signal output from the detection circuit 31 activates the resistance attenuator 34 via the gate circuit 23. The resistance attenuator 34 controls the current in such a manner that a signal having a second output voltage greater than the first output voltage is, for example, applied as a working signal to the electrode pair 35.

The present embodiment provides a sorting circuit with a single signal generator.

[Other Embodiments]

The present disclosure is not limited to the preferred embodiments described above and can be practiced in various other embodiments.

For example, the electrode 16 and the detection electrode pair 19 shown in FIG. 3 need not be in the illustrated forms but may be in other forms. For example, the electrode fingers 16*a* may differ in length in the Y direction.

For example, the sorting circuit according to the embodiment shown in FIG. 9 or 10 may be provided in multiple stages to serve the same purpose as the sorting circuit according to the embodiment shown in FIG. 8.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A cell sorter comprising:

a measuring electrode provided in a flow path having branch paths adapted to sort cells and through which a fluid including the cells flows, the measuring electrode provided upstream from the branch paths, the measuring electrode operable to form a measuring electric field in the flow path to measure a complex dielectric constant of each of the cells flowing through the flow path;

a working electrode provided downstream from the measuring electrode and upstream from the branch paths, the working electrode including a plurality of separate electrode groups each including a first electrode and a opposed second electrode that form separate working electrode pairs, each working electrode pair operable to form, in the flow path, a separate working electric field to sort the cells by imparting a dielectrophoretic force to the cells and using the flow path;

an electric field application section configured to individually apply voltages to the working electrode pairs such that the working electrode pairs individually control the separate working electric fields;

a plurality of detection electrode pairs, each detection electrode pair provided downstream from the measuring electrode and upstream from the branch paths, each of the detection electrode pairs corresponds to a different one of the separate electrode groups and positioned upstream and in proximity to the respective electrode group to detect the presence of the cell in the fluid flowing through the flow path; and an output section operable to acquire sorting signals based on information about the measured complex dielectric constants and detection signals indicating the detection of the one or more cells by the respective detection electrode pairs, the output section operable to output working signals adapted to form the working electric field in the respective working electrode pair when the detection signals are acquired if the sorting signals are acquired, thereby permitting variable sorting control of a plurality of different cells concurrently flowing through a portion of the flow path that includes the working electrode pairs.

2. The cell sorter according to claim 1, wherein the working electrode pairs are arranged in a plurality of stages along the direction in which the fluid flows through the flow path.

3. The cell sorter according to claim 1, wherein the first electrode of each of the working electrode pairs includes a plurality of electrode fingers projecting toward the respective opposed second electrode.

4. A cell sorting method comprising:

forming, in a flow path having branch paths adapted to sort cells and through which a fluid including the cells flows, a measuring electric field upstream from the branch paths to measure a complex dielectric constant of each of cells flowing through the flow path;

forming a plurality of separate working electric fields associated with a plurality of working electrode pairs of a working electrode in the flow path downstream from where the measuring electric field is formed and upstream from the branch paths to sort the cells by imparting a dielectrophoretic force to the cells and using the branch path, the working electrode including a plurality of separate electrode groups each including a first electrode and a opposed second electrode that form the separate working electrode pairs;

individually applying voltages to the working electrode pairs such that the working electrode pairs individually control the separate working electric fields;

detecting by a plurality of detection electrode pairs, the presence of the cell in the fluid flowing through the flow path upstream from the branch paths and in proximity to where the working electrode is formed, each of the detection electrode pairs corresponds to a different one of the separate electrode groups and positioned upstream and in proximity to the respective electrode group to detect the presence of the cell in the fluid flowing through the flow path; and generating, if determination signals based on information about the measured complex dielectric constants are acquired, working signals to form the working electric fields when detection signals indicating the detection of the presence one or more cells are acquired, thereby permitting variable sorting control of a plurality of different cells concurrently flowing through a portion of the flow path that includes the working electrode pairs.

* * * * *